United States Patent
Pihl et al.

(10) Patent No.: US 6,397,074 B1
(45) Date of Patent: May 28, 2002

(54) GPS ASSISTANCE DATA DELIVERY METHOD AND SYSTEM

(75) Inventors: Kari Pihl, Kaarina; Hannu Pirilä, Littoinen, both of (FI)

(73) Assignee: Nokia Mobile Phones Limited (FI)

( * ) Notice: Subject to any disclaimer, the term of this patent is extended or adjusted under 35 U.S.C. 154(b) by 0 days.

(21) Appl. No.: 09/547,485

(22) Filed: Apr. 12, 2000

Related U.S. Application Data

(60) Provisional application No. 60/133,062, filed on May 7, 1999, and provisional application No. 60/133,287, filed on May 10, 1999.

(51) Int. Cl.[7] .................................................. H04Q 7/20
(52) U.S. Cl. ................. 455/456; 455/461; 342/357.06; 342/357.12; 701/213
(58) Field of Search .................................. 455/456, 457, 455/461; 342/357.06, 357.12; 701/200, 213

(56) References Cited

U.S. PATENT DOCUMENTS

| | | | |
|---|---|---|---|
| 5,712,899 A | 1/1998 | Pace, II | 379/58 |
| 5,982,324 A | 11/1999 | Watters et al. | 342/357.06 |
| 6,070,078 A | 5/2000 | Camp, Jr. et al. | 455/456 |

*Primary Examiner*—Doris H. To
(74) *Attorney, Agent, or Firm*—Harrington & Smith, LLP

(57) ABSTRACT

A Network Assisted Mobile Terminal GPS system includes a plurality of GPS-capable mobile terminals (10) each having a transceiver, and a wireless telecommunications network (32) having at least one base site transceiver (30) for transmitting GPS Assistance Data to individual ones of the plurality of GPS-capable mobile stations using a point-to-point signalling protocol. In the illustrative embodiment described herein the point-to-point signalling protocol is comprised of at least one of an IMSI (International Mobile Subscriber Identity) Attach, a Normal Location Update, or a Periodic Location Update signalling protocol.

2 Claims, 3 Drawing Sheets

GPS ASSISTANCE DATA DELIVERY METHOD AND SYSTEM

CLAIM OF PRIORITY FROM A COPENDING PROVISIONAL PATENT APPLICATION

Priority is herewith claimed under 35 U.S.C. §119(e) from copending Provisional Patent Application No. 60/133,062, filed May 7, 1999, by Kari Pihl and Hannu Pirilä. Priority is also herewith claimed under 35 U.S.C. §119(e) from copending Provisional Patent Application No. 60/133,287, filed May 10, 1999, by Kari Pihl and Hannu Pirilä. The disclosure of each of these Provisional Patent Applications is incorporated by reference herein in its entirety.

FIELD OF THE INVENTION

This invention relates generally to wireless telecommunications systems and, more particularly, to signalling between a mobile terminal and a wireless network for use in obtaining mobile terminal position location information.

BACKGROUND OF THE INVENTION

The use of the Global Positioning System (GPS) satellite constellation for obtaining a terrestrial position fix (latitude and longitude) is widespread and well known. It has been proposed that mobile terminals (such as, but not limited to, cellular telephones) in modern wireless telecommunications systems include a capability to receive the GPS signals and to thereby calculate their position on the surface of the Earth.

In order to improve the performance of position calculation as compared to stand-alone GPS a mobile terminal can have, in addition to GPS receiver capability, access to so-called GPS Assistance Data. The GPS Assistance Data is the same for all GPS capable mobile terminals within a given location area, and it would appear that the most straightforward technique would be to broadcast (i.e., point-to-multipoint) the GPS Assistance Data to all GPS-capable mobile terminals within the location area. The Assistance Data is not specific to any one mobile terminal, but can instead be used by a plurality of the GPS-capable mobile terminals. The GPS Assistance Data is composed of a large amount of data (about 500 bits/satellite) that is required to be delivered from the network side of the wireless telecommunications system to the GPS-capable mobile terminals. The GPS Assistance Data contains the following elements:

(A) Number of satellites (B) Reference time (C) Reference location (the serving Base Transceiver Station (BTS) location)

(D) Satellite ID, Ephemeris, clock corrections, etc.

(E) Optional DGPS corrections.

However, in current wireless telecommunication protocols, such as the one known as the Global System for Mobile Communications, or GSM, the capacity of the point-to-multipoint broadcast channels (e.g., BCCH, SMS-CB) is limited. As such, it would be difficult or impossible in a practical sense to fit the required GPS Assistance Data into the currently defined point-to-multipoint broadcast channels.

OBJECTS AND ADVANTAGES OF THE INVENTION

It is a first object and advantage of this invention to provide an improved signalling technique to enable GPS Assistance Data to be delivered to a mobile terminal.

It is a further object and advantage of this invention to provide an improved signalling technique to enable GPS Assistance Data to be delivered to a mobile terminal using a point-to-point signalling protocol, as opposed to a point-to-multipoint (broadcast) protocol.

It is a further object and advantage of this invention to improve performance of a mobile terminal in a power-on stage, as well as the overall GPS accuracy, while active in the wireless network, as compared to stand-alone GPS.

SUMMARY OF THE INVENTION

The foregoing and other problems are overcome and the objects of the invention are realized by methods and apparatus in accordance with embodiments of this invention.

This invention teaches a method whereby GPS Assistance Data is transmitted to GPS-capable mobile terminals. The mobile stations receiving this data are thereby enabled to accurately calculate their own positions, in conjunction with received GPS signals. An example of the utility of this invention is its use in the Global System for Mobile Communications (GSM) Phase 2, plus Location Services (LCS) protocols, but this important application is only one of many wherein the teachings of this invention can be used with advantage.

The inventors have realized that one property of the GPS Assistance Data, which may be used in a Network Assisted Mobile Terminal GPS (NAMT-GPS) system, is that the lifetime of the GPS Assistance Data is relatively long (about 2 hours). To establish a point-to-multipoint broadcast channel for this type of long lifetime data is thus unnecessary and wasteful of system resources. The GPS Assistance Data can instead best be delivered to GPS-capable mobile terminals using point-to-point signalling protocols, preferably employing already defined point-to-point signalling protocols and message types. The long lifetime of the GPS Assistance Data thereby enables the wireless network to use the following exemplary GSM procedures for delivering the GPS Assistance Data from the network to the mobile terminal: IMSI (International Mobile Subscriber Identify) Attach, Normal Location Update, Periodic Location Update.

In accordance with the teachings of this invention no point-to-multipoint broadcast channel is required to be established or used for sending the GPS Assistance Data to the mobile terminals. Instead the GPS Assistance Data is transmitted to GPS-capable mobile terminals in a point-to-point manner using, for example, already defined IMSI Attach and Location Update procedures. In this way the network loading is not adversely affected by a requirement to provide a broadcast channel for this purpose.

A Network Assisted Mobile Terminal GPS system, in accordance with this invention, thus includes a plurality of GPS-capable mobile terminals each having a transceiver, and a wireless telecommunications network having at least one base site transceiver for transmitting GPS Assistance Data to individual ones of the plurality of GPS-capable mobile stations using a point-to-point signalling protocol. In the illustrative embodiment described herein the point-to-point signalling protocol is comprised of at least one of an IMSI (International Mobile Subscriber Identity) Attach, a Normal Location Update, or a Periodic Location Update signalling protocol.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
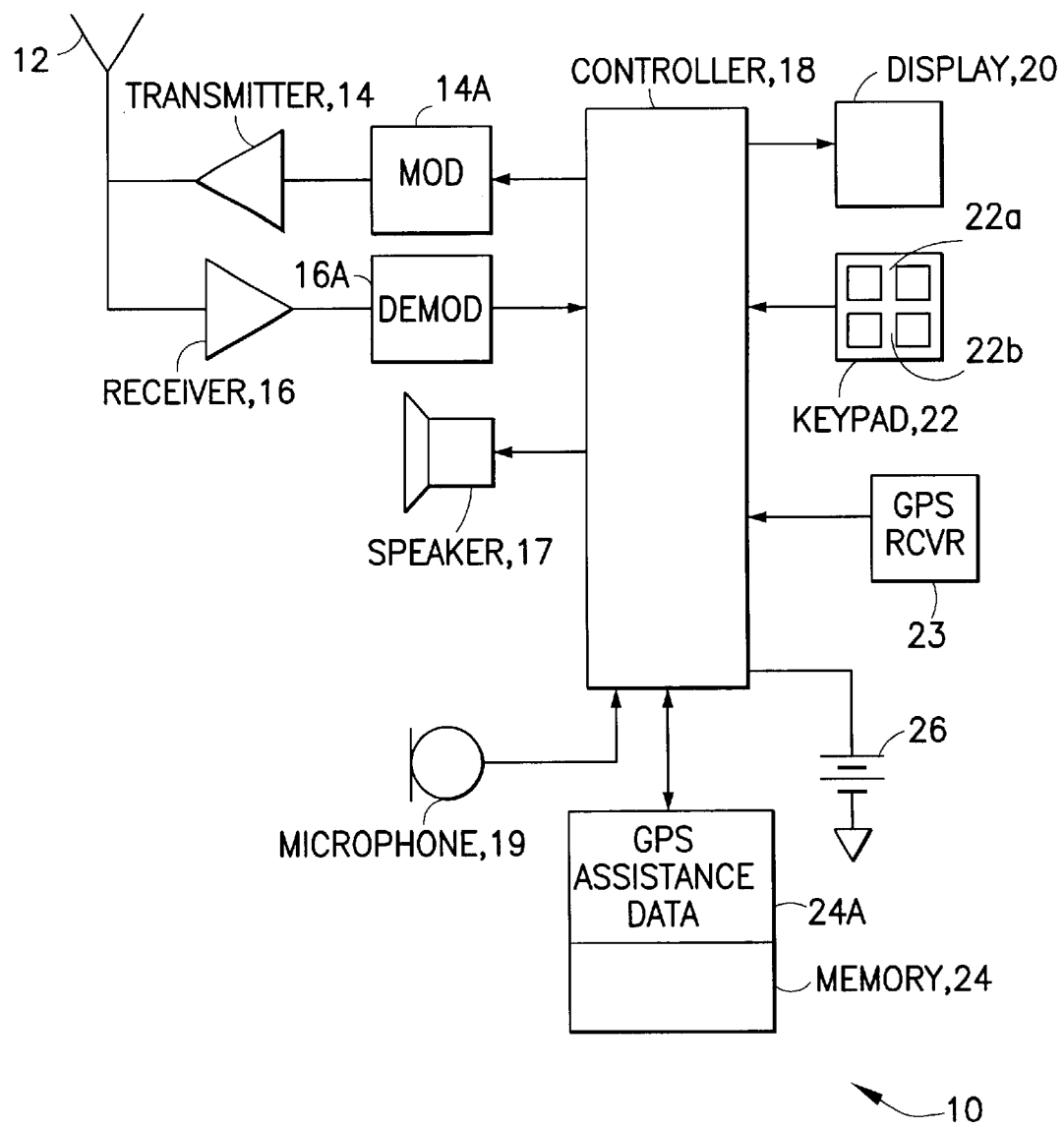
FIG. 1 is a block diagram of a mobile terminal that is constructed and operated in accordance with this invention.
Figure 2:
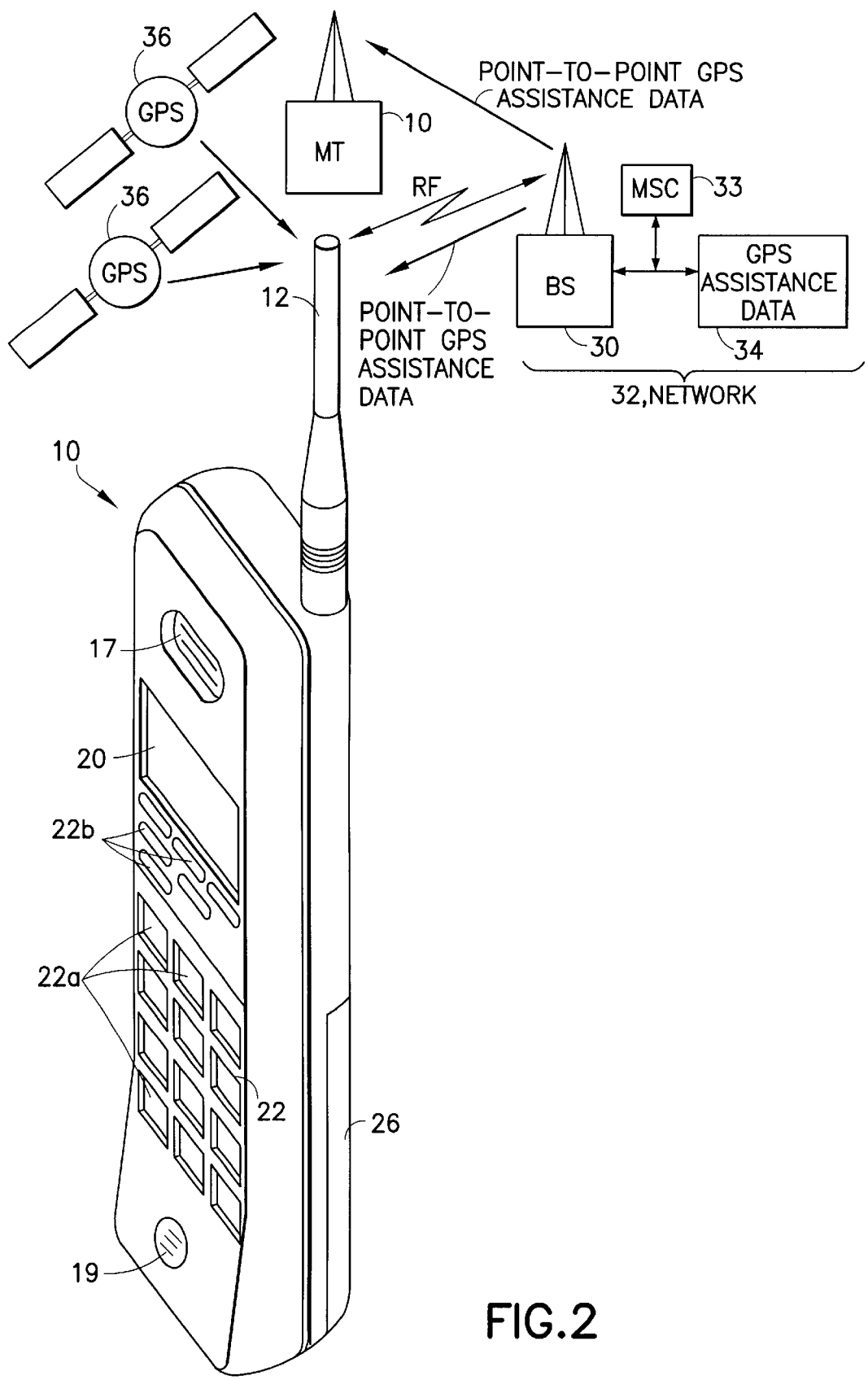
FIG. 2 is an elevational view of the mobile terminal shown in FIG. 1, and which further illustrates a wireless telecommunications system or network to which the mobile terminal is bidirectionally coupled through wireless RF links.

Reference is made to FIGS. 1 and 2 for illustrating a wireless mobile terminal 10, such as but not limited to a cellular radiotelephone or a personal communicator, that is suitable for practicing this invention. The mobile terminal 10 includes an antenna 12 for transmitting signals to and for receiving signals from a base site (BS) or base transceiver station 30. The BS 30 is a part of a wireless network 32 that typically includes a mobile switching center (MSC) or similar system for providing a connection to landline trunks when the mobile terminal 10 is involved in a call. In this invention the network 32 includes or has access to or can calculate GPS Assistance Data 34. By example, the GPS Assistance Data 34 can be determined in a Serving Mobile Location Center (SMLC), which could reside in either the Network and Switching Sub-system (NSS) or in the Base Station Sub-system (BSS). For the purposes of the teachings of this invention, it is not important where in the network 32 the GPS Assistance Data 34 originates or resides. The network 32 will typically include a Mobile Switching Center (MSC) 33 network component.

The mobile terminal 10 is GPS-capable, as it includes or is coupled to a GPS receiver 23, and further includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable wireless network or system, and typically also includes user speech and/or user data. The air interface standard is assumed for this invention to include a capability to transmit a point-to-point message from the network 32 to the mobile terminal 10.

It is understood that the controller 18 also includes the circuitry required for implementing the audio and logic functions of the mobile terminal. By example, the controller 18 may be comprised of a digital signal processor device, a microprocessor device, and various analog to digital converters, digital to analog converters, and other support circuits. The control and signal processing functions of the mobile terminal are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile terminal 10. The mobile terminal 10 typically also includes a battery 26 for powering the various circuits that are required to operate the mobile terminal.

The mobile terminal 10 also includes various memories, shown collectively as the memory 24, wherein are stored a plurality of constants and variables that are used by the controller 18 during the operation of the mobile terminal. For example, the memory 24 stores the values of various system parameters and mobile terminal-specific information, such as a number assignment module (NAM). An operating program for controlling the operation of controller 18 is also stored in the memory 24 (typically in a ROM device).

The memory 24, in accordance with an aspect of this invention, also stores in a portion 24A the GPS Assistance Data that it receives from the network 32 via the point-to-point signalling protocol, such as in the following exemplary GSM procedures for delivering the GPS Assistance Data from the network 32 to the mobile terminal 10: IMSI Attach, Normal Location Update, or Periodic Location Update.

It is noted that the original purpose for the IMSI Attach, Normal Location Update Periodic Location Update is for the mobile station 10 to inform the network 32 when entering the network, changing location area, or periodically updating its presence in the network. This is typically done with respect to the MSC/VLR, although one MSC/VLR can include more than one Location area. The identification codes used are the Location Area Identity (LAI). If the mobile station 10 for some reason does not make a periodic location update in a timely manner, the MSC/VLR will remove the registration information for this mobile station 10.

In accordance with an aspect of this invention, when the mobile station 10 requests a channel for the location update, it requests a "follow-on procedure" from the network 32. This means that when the location update is done first, the MSC 33 does not close the connection until requested by the mobile station 10. Reference in this regard may be had to, for example, GSM 04.08, Section 10.5.3.5, Location Updating Type, and Table 10.65/GSM 04.08 Location Updating Type Information Element, wherein the coding for a Follow-On Request (FOR) bit is specified.

If multiple point-to-point messages are required to convey the GPS Assistance Data to the mobile station 10, then this is handled by established message segmentation procedures in the lower level messaging protocols.

The network 32 knows that a particular mobile station 10 is GPS-capable by receiving, for example, Mobile Station Classmark information in an IMSI Attach, etc., and during call initialization. By example, the mobile station 10 capabilities can be found in the Mobile Station Classmark 3 (see, for example, GSM 04.08, Section 10.5.1.7), which can include bits for coding whether the mobile station 10 supports mobile station assisted GPS, mobile station based GPS, or conventional GPS capability.

In the illustrated embodiment the mobile terminal 10 includes the GPS receiver 23. The GPS receiver 23 is used in conjunction with the stored GPS Assistance Data for calculating the location of the mobile terminal 10 based on transmissions received from GPS satellites 36. As is shown in FIG. 2, at least one other GPS-capable mobile terminal 10 also receives the GPS Assistance Data in a point-to-point transmission from the network 32.

To summarize, due to the relatively large amount of GPS Assistance Data (e.g., 500 bits/satellite), and further in view of the relatively long lifetime of the GPS Assistance Data, the inventors have realized that it would be impractical or at least wasteful of system resources to provide a point-to-multipoint (broadcast) channel to transmit the GPS Assistance Data from the network 32 to the GPS-capable mobile terminals 10. That is, due to the long lifetime of the GPS Assistance Data, this data can be delivered from the network 32 to the mobile terminal 10 in a point-to-point manner using, by example, normal IMSI Attach and Location Update procedures. Benefits of this approach include the fact that the capacity of the network 32 is not detrimentally affected, and no special new signalling arrangements need to be established.

One problem which this invention overcomes is that the additional point-to-point connection between the mobile terminal 10 and the network 32, to the GPS Assistance Data 34, need not be established, as the same end result can be achieved with, by example, IMSI Attach and Location Update point-to-point connections.

Another advantage made possible by this invention is the possibility to implement a Network Assisted Mobile Terminal Based GPS system without requiring that a point-to-multipoint broadcast channel be specified for the delivery of the GPS Assistance Data from the network 32 to the GPS-capable mobile terminals 10.

Furthermore, no compromise need be made in the amount of GPS Assistance Data that can be transmitted to a GPS capable mobile terminal 10, since the point-to-point connection to the network 32 in the IMSI Attach and Location Update signalling provides all the required bandwidth to transmit the GPS Assistance Data with the desired accuracy.

Figure 3:
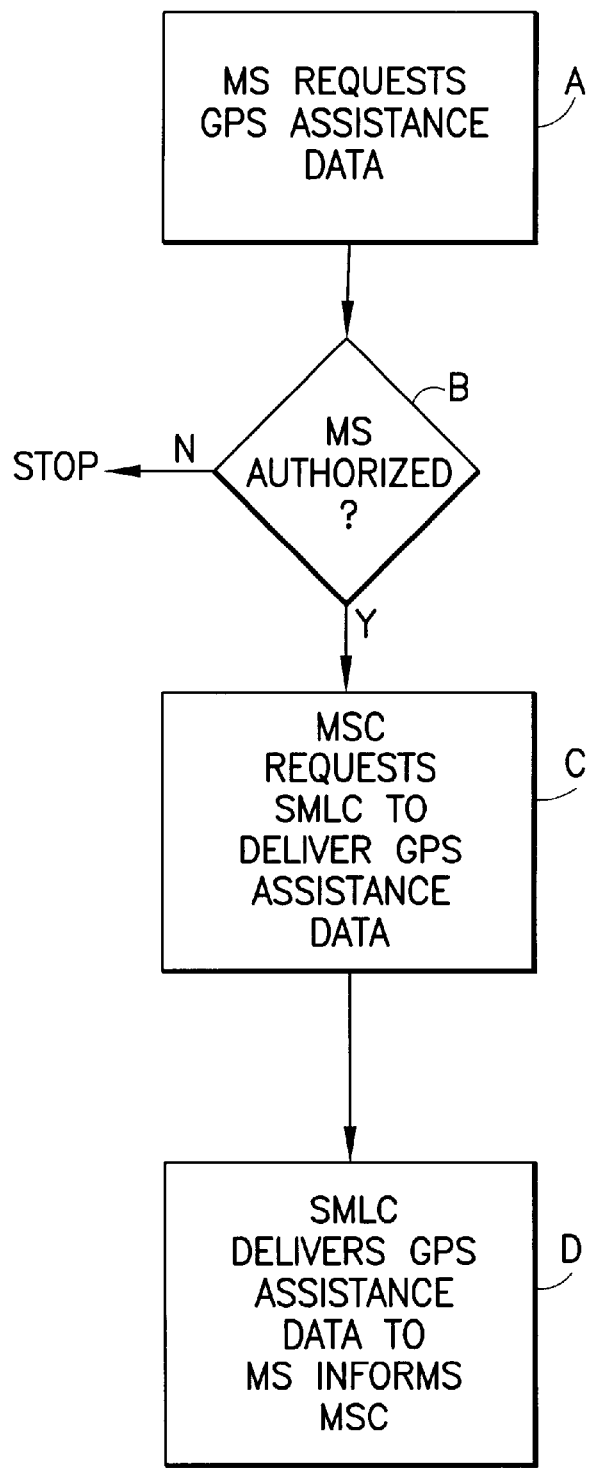
FIG. 3 is a logic flow diagram of a method in accordance with the teachings of this invention.

Referring now to FIG. 3, a method in accordance with this invention proceeds as follows. At Step A the mobile station 10 requests the GPS Assistance Data using a supplementary service, preferably by using a Mobile Originated Location Request (MO-LR). The request is made to the network 32, such as to the Mobile Switching Center (MSC) 33 network component (see FIG. 1). At Step B the MSC 33 checks a subscriber profile to determine if the mobile station 10 is authorized to receive the GPS location service. Assuming that this check succeeds, at Step C the MSC 33 requests the Serving Mobile Location Center (SMLC), assumed for this example to be the unit 34 of FIG. 1, to deliver the requested GPS Assistance Data to the mobile station 10. At Step D the SMLC 34 delivers the GPS Assistance Data to the mobile station 10, using a RRLP protocol, and then informs the MSC 33 that the requested GPS Assistance Data has been delivered. The MSC 33 then makes any necessary billing reports, and informs the mobile station 10 that the supplementary service has been fulfilled.

The MO-LR after location update request may thus be used to request GPS Assistance Data using the follow-on procedure specified in, by example, GSM 04.08. Note, for example Section 4.4.1, Location Updating Procedure, Section 4.4.2, Periodic Updating and Section 4.4.3, IMSI Attach Procedure, as well as the above-mentioned Section 10.5.3.5, Location Updating Type, and Table 10.65/GSM 04.08 Location Updating Type Information Element, where the coding for the FOR bit is specified.

It should be noted that the invention can be implemented in mobile terminals for LCS applications as a part of mobile terminal based/assisted E-OTD/GPS location methods.

While described in the context of a specific GSM embodiment, those skilled in the art should realize that the teachings of this invention apply as well to other types of TDMA systems, as well as to other type of multiple access systems, such as CDMA and wideband CDMA (WCDMA) systems. Thus, while the invention has been particularly shown and described with respect to preferred embodiments thereof, it will be understood by those skilled in the art that changes in form and details may be made therein without departing from the scope and spirit of the invention.

What is claimed is:

1. A method for providing GPS Assistance data to a mobile station, comprising steps of:

making a request for the GPS Assistance Data with a mobile station using a Mobile Originated Location Request after a Location Update with a Follow-On Request pending; and delivering the requested GPS Assistance Data to the mobile station in a point-to-point manner using a Follow-On procedure.

2. A method as in claim 1, wherein the Location Update is one of an IMSI (International Mobile Subscriber Identity) Attach, a Normal Location Update, or a Periodic Location Update.

* * * * *